(12) United States Patent
Numata

(10) Patent No.: US 6,989,870 B2
(45) Date of Patent: Jan. 24, 2006

(54) VIDEO SIGNAL PROCESSING APPARATUS AND METHOD CAPABLE OF CONVERTING AN INTERLACE VIDEO SIGNAL INTO A NON-INTERLACE VIDEO SIGNAL

(75) Inventor: Takehiko Numata, Hidaka (JP)

(73) Assignee: Kabushiki Kaisha Toshiba, Tokyo (JP)

(*) Notice: Subject to any disclaimer, the term of this patent is extended or adjusted under 35 U.S.C. 154(b) by 485 days.

(21) Appl. No.: 10/234,699

(22) Filed: Sep. 5, 2002

(65) Prior Publication Data
US 2003/0103164 A1    Jun. 5, 2003

(30) Foreign Application Priority Data
Nov. 30, 2001    (JP) .............................. 2001-367823

(51) Int. Cl.
H04N 7/01    (2006.01)
H04N 5/14    (2006.01)

(52) U.S. Cl. ................... 348/448; 348/671; 348/691

(58) Field of Classification Search ............ 348/448, 348/671, 674, 678, 687, 691, 692

See application file for complete search history.

(56) References Cited

U.S. PATENT DOCUMENTS 5,844,619 A * 12/1998 Songer ...................... 348/447
6,144,412 A * 11/2000 Hirano et al. .............. 348/441

FOREIGN PATENT DOCUMENTS

| JP | 63-179685 | 7/1988 |
| JP | 9-65173 | 3/1997 |
| JP | 10-112845 | 4/1998 |
| JP | 10-336597 | 12/1998 |
| JP | 11-205633 | 7/1999 |

OTHER PUBLICATIONS

Japanese Office Action dated Sep. 7, 2004, for Japanese Patent Application No. 2001-367823.
Japanese Office Action dated Sep. 27, 2005 for Appin No. 2001-367823

* cited by examiner

Primary Examiner—Victor R. Kostak
(74) Attorney, Agent, or Firm—Pillsbury Winthrop Shaw Pittman LLP

(57) ABSTRACT

When converting an interlace video signal into a non-interlace video signal by interpolating a scanning line of the interlace video signal, black stretching is carried out with respect to the interpolated scanning line. Thereafter, black stretching is carried out with respect to a non-interpolation scanning line of the converted non-interlace video signal.

11 Claims, 4 Drawing Sheets

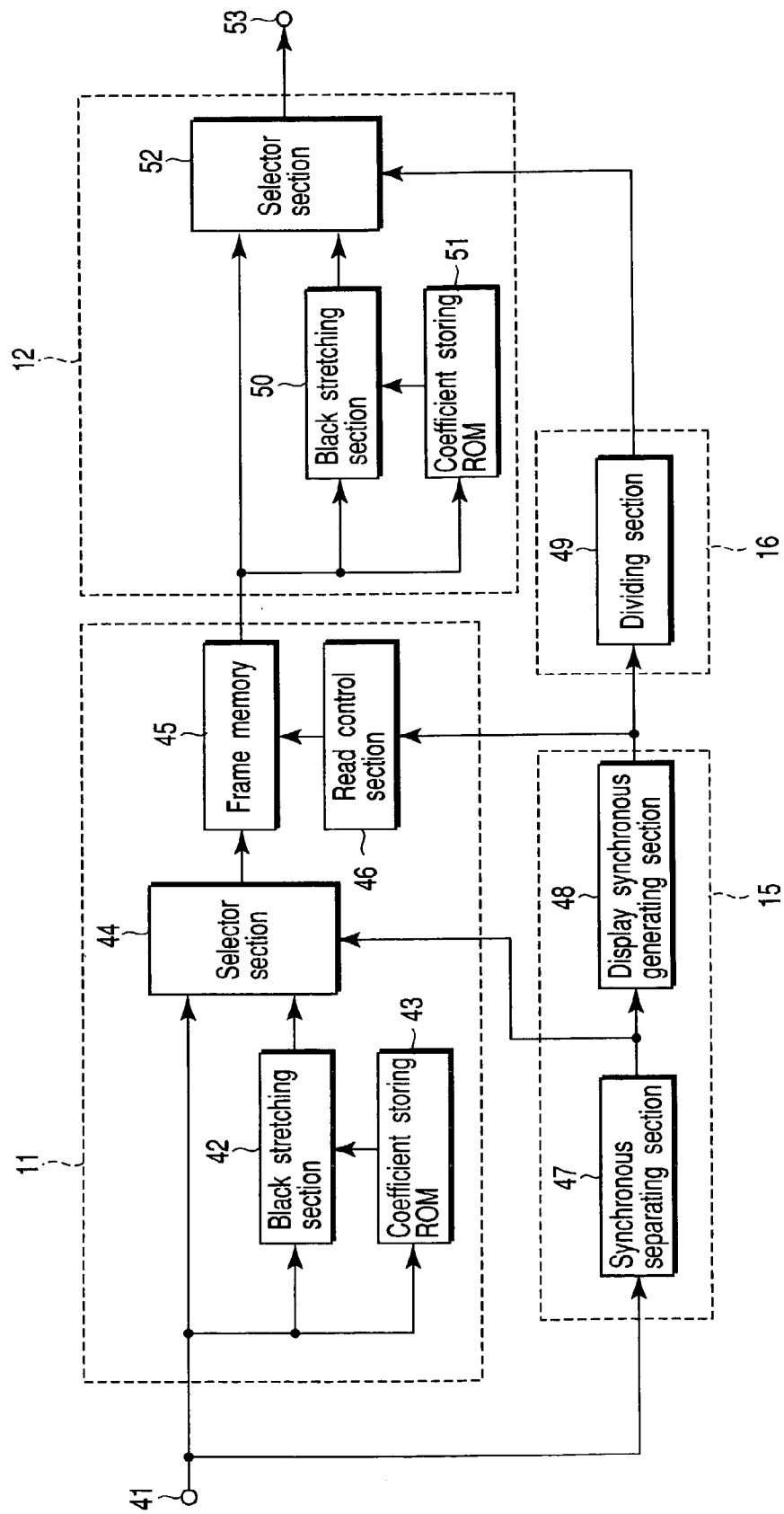
F I G. 4

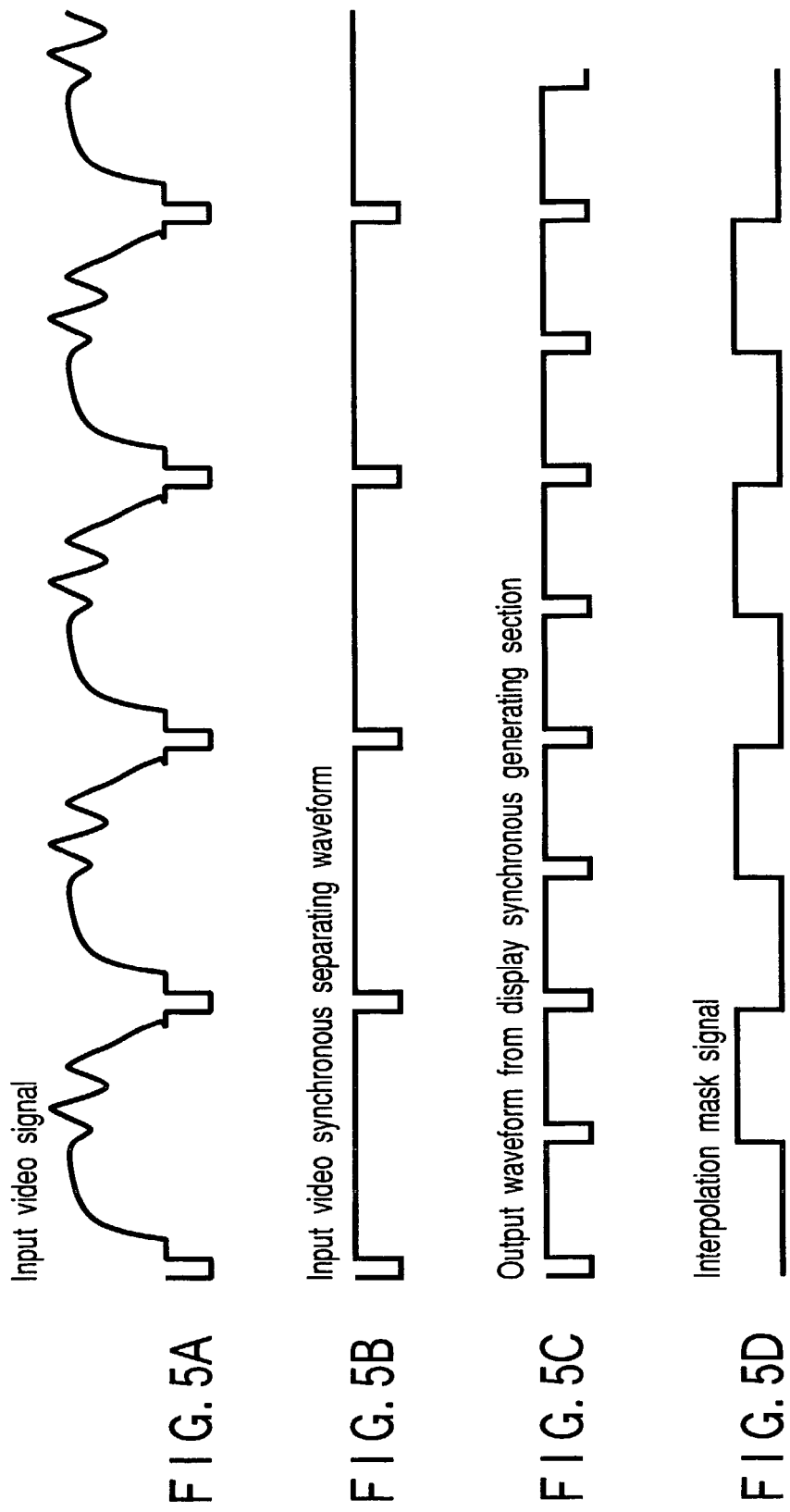

VIDEO SIGNAL PROCESSING APPARATUS AND METHOD CAPABLE OF CONVERTING AN INTERLACE VIDEO SIGNAL INTO A NON-INTERLACE VIDEO SIGNAL

CROSS-REFERENCE TO RELATED APPLICATIONS

This application is based upon and claims the benefit of priority from the prior Japanese Patent Application No. 2001-367823, filed Nov. 30, 2001, the entire contents of which are incorporated herein by reference.

BACKGROUND OF THE INVENTION

1. Field of the Invention

The present invention relates to improvement in apparatus and method of processing a video signal, which is capable of converting an interlace video signal into a non-interlace video signal having a number of scanning lines double the original number of scanning lines in one field.

2. Description of the Related Art

As well known, in recent years, the display performance of television receivers has been improved, with larger-sized television screens and better definition (high image quality). As a result, a problem related to image quality, which was not conspicuous before, has arisen. For example, when a television receiver displays an interlaced video signal, line flicker and large-sized screen flicker are sometimes conspicuous.

For this reason, the interlace video signal is displayed after being converted into a non-interlace video signal. In this case, the non-interlace video signal is generated in the following manner. That is, double speed conversion is made with respect to an interlace video signal, using an image memory so that the number of scanning lines in one field is double the original number of scanning lines. However, according to the above method, although no line flicker or large-sized screen flicker are generated, there is the problem of deterioration (reduction) in vertical resolution, due to the scanning line interpolation method.

In order to solve the above problem, there has been conventionally developed the following technique of reducing the deterioration of image quality, as disclosed in Jpn. Pat. Appln. KOKAI Publication No. 63-179685, for example. According to the above technique, the luminance level of the interpolation signal is changed in accordance with the luminance level of the original video signal, and thereby, a visual contrast feel is improved between the scanning lines.

Meanwhile, in order to improve the above visual contrast feel, the television receiver is provided with a black stretching circuit, which reduces a luminance level lower portion of the video signal to a black signal level or less, regardless of the following television receiver types. The types include a type displaying only an interlace video signal, and a type capable of displaying interlace and non-interlace converted video signals.

An inputted interlace video signal is converted into a non-interlace video signal by generating an interpolation signal generated from each scanning line of the inputted video signal. In this case, the black stretching circuit has a function of carrying out black stretching with respect to the generated interpolation signal, as a function of varying the luminance level.

In the non-interlace video signal having the black stretched interpolation signal generated by the scanning line interpolation, black stretching is further carried out with respect to each scanning line of the original video signal. Thereafter, the video signal is image-displayed by a display section via a display drive circuit.

Incidentally, in the above television receiver, a scanning line interpolating circuit carries out black stretching with respect to an interpolated scanning line in order to prevent a deterioration of vertical resolution resulting from the scanning line interpolation. For this reason, the latter-stage of the scanning line interpolating circuit, that is, a black stretching circuit detects an already black-stretched portion of the interpolation signal outputted from the scanning line interpolating circuit.

In this case, in the black stretching circuit, when many black-stretched portions exist in the preceding scanning line, an internal time constant is set so that a response time for carrying out black stretching with respect to a video signal of the next scanning line becomes late. As a result, there is a problem that sufficient black stretching is not carried out with respect to the original video signal, which should be black-stretched.

BRIEF SUMMARY OF THE INVENTION

The present invention has been made taking the above circumstances into consideration. Accordingly, it is an object of the present invention to provide an apparatus and method of processing a video signal, which can carry out proper black stretching with respect to the original video signal and the interpolation signal when converting an interlace video signal into a non-interlace video signal.

According to one aspect of the present invention, there is provided an apparatus for processing a video signal, comprising:

a converting section configured to convert an interlace video signal into a non-interlace video signal by interpolating a scanning line of the interlace video signal, and carrying out black stretching with respect to the interpolated scanning line; and a black stretching control section configured to carry out black stretching with respect to a non-interpolation scanning line of the non-interlace video signal outputted from the converting section.

According to one aspect of the present invention, there is provided a method of processing a video signal, comprising:

converting an interlace video signal into a non-interlace video signal by interpolating a scanning line of the interlace video signal, and carrying out black stretching with respect to the interpolated scanning line; and carrying out black stretching with respect to a non-interpolation scanning line of the converted non-interlace video signal.

According to the above configuration and method, black stretching is carried out with respect to the non-interpolation scanning line of the non-interlace video signal in which black stretching is carried out with respect to the interpolation scanning line. Therefore, sufficient and proper black stretching is carried out with respect to the original video signal and the interpolation signal, so that a deterioration of vertical resolution can be prevented.

BRIEF DESCRIPTION OF THE SEVERAL VIEWS OF THE DRAWING

FIG. 4 is a block diagram to explain a detailed configuration of each section of the television receiver according to the embodiment; and FIG. 5A to FIG. 5D are individual views to explain a signal waveform of each section of the television receiver according to the embodiment.

DETAILED DESCRIPTION OF THE INVENTION

Figure 1:
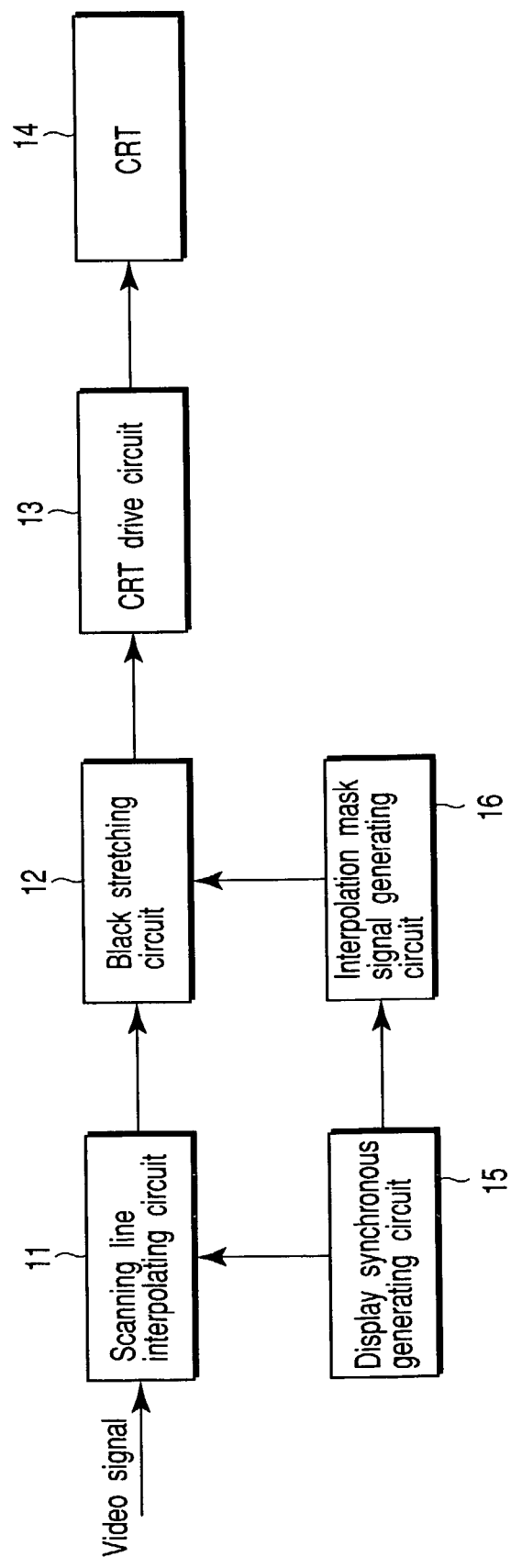
FIG. 1 shows one embodiment of the present invention, and is a block diagram to schematically explain a configuration of a television receiver.

An embodiment of the present invention will be described below with reference to the accompanying drawings. FIG. 1 schematically shows a configuration of a television receiver, which will be described in the present embodiment. The television receiver converts an interlace video signal into a non-interlace video signal, and has a function of varying a luminance level of the interpolation signal and a black stretching function.

In FIG. 1, a reference numeral 11 denotes a scanning line interpolating circuit. The scanning line interpolating circuit 11 has a function of converting an inputted interlace video signal into a non-interlace video signal by generating an interpolation signal from each scanning line of the interlace video signal. Further, the scanning line interpolating circuit 11 has a function of carrying out black stretching with respect to the generated interpolation signal, as a function of varying the luminance level.

The non-interlace video signal having the black stretched interpolation signal, outputted from the scanning line interpolating circuit 11, is supplied to a black stretching circuit 12 so that black stretching can be carried out with respect to each scanning line of the original video signal. Thereafter, the video signal is image-displayed by a CRT (Cathode Ray Tube) 14 via a CRT drive circuit 13.

Here, in FIG. 1, a reference numeral 15 denotes a display synchronous generating circuit. The display synchronous generating circuit 15 generates a horizontal synchronizing signal and a vertical synchronizing signal for displaying a non-interlace television image.

The horizontal synchronizing signal and the vertical synchronizing signal generated by the display synchronous generating circuit 15 are supplied to each of the above scanning line interpolating circuit 11 and interpolation mask signal generating circuit 16. The scanning line interpolating circuit 11 carries out scanning line interpolation based on the horizontal synchronizing signal and the vertical synchronizing signal supplied from the display synchronous generating circuit 15. Further, the scanning line interpolating circuit 11 carries out black stretching with respect to the interpolated scanning line, and thereafter, outputs it to the black stretching circuit 12.

On the other hand, the interpolation mask signal generating circuit 16 detects an output timing of the interpolated scanning line from the scanning line interpolating circuit 11 based on the horizontal synchronizing signal and the vertical synchronizing signal supplied from the display synchronous generating circuit 15. Further, the interpolation mask signal generating circuit 16 outputs an interpolation mask signal to the black stretching circuit 12 while the interpolated scanning line is outputted from the scanning line interpolating circuit 11.

The black stretching circuit 12 is controlled in the following manner. That is, when no interpolation mask signal is outputted from the interpolation mask signal generating circuit 16, the black stretching circuit 12 carries out predetermined black stretching with respect to the inputted video signal. On the other hand, when the interpolation mask signal is outputted from the interpolation mask signal generating circuit 16, the black stretching circuit 12 stops black stretching with respect to the inputted video signal so that the inputted interpolation scanning line can be intactly outputted.

According to the above embodiment, the interpolation mask signal is supplied to the black stretching circuit 12 so that no black stretching can be carried out with respect to the interpolation scanning line outputted from the scanning line interpolating circuit 11. Black stretching is carried out with respect to the original scanning line, that is, a non-interpolation signal by the black stretching circuit 12.

More specifically, the scanning line interpolating circuit 11 outputs the scanning line of the original video signal and the interpolated scanning line alternately. Therefore, the black stretching circuit 12 needs to perform the black stretching on only the non-interpolation scanning lines.

As a result, the black stretching circuit 12 is capable of sufficiently carrying out black stretching with respect to the non-interpolation scanning line by the original video signal. Therefore, when converting the interlace video signal into the non-interlace video signal, sufficient and proper black stretching is carried out with respect to each of the original video signal and the interpolation signal, so that a deterioration of vertical resolution can be prevented.

Figure 2:
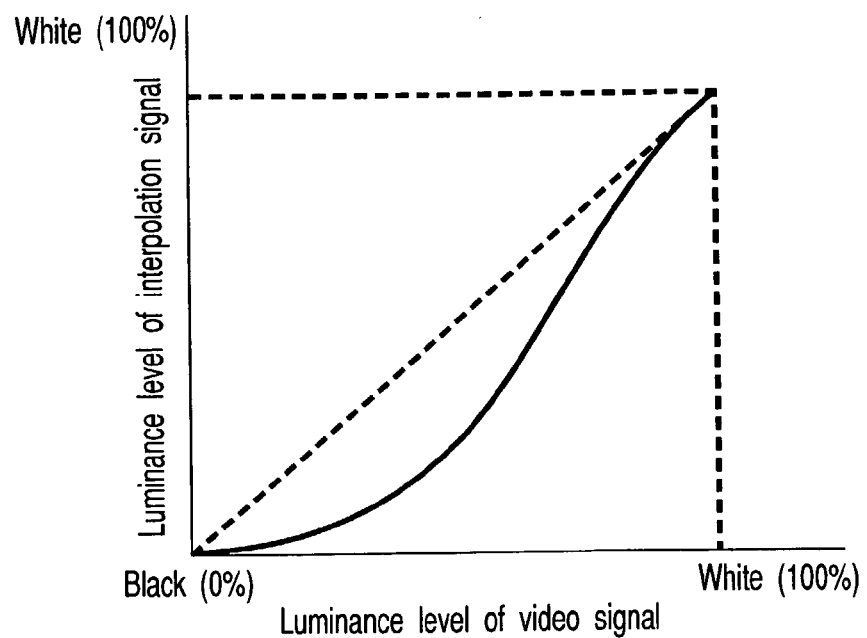
FIG. 2 is a graph to explain one example of input-output characteristics of a black stretching circuit according to the embodiment.
Figure 3:
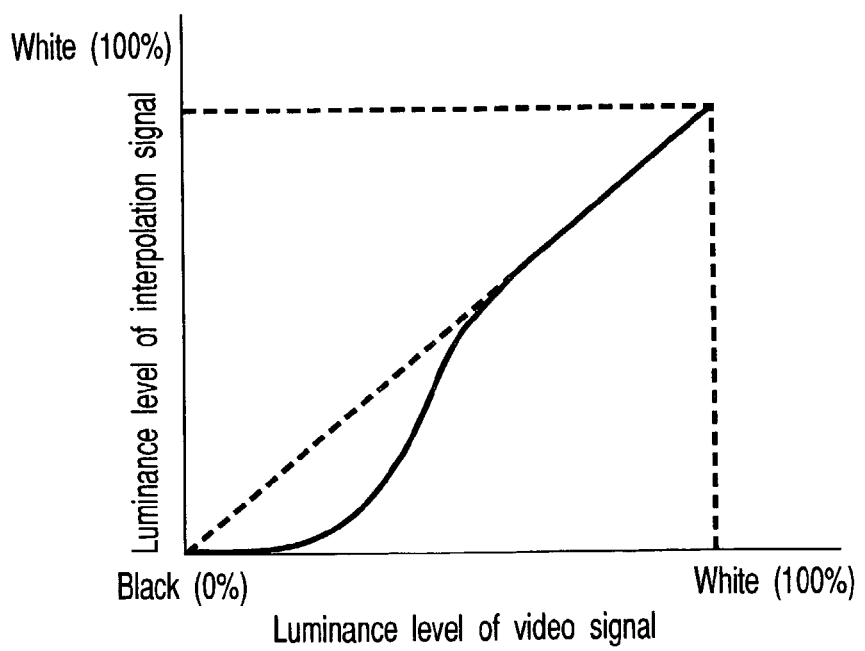
FIG. 3 is a graph to explain another example of input-output characteristics of the black stretching circuit according to the embodiment.

In this case, the used black stretching circuit 12 has input-output characteristics of non-linearly varying a luminance level of the interpolated signal in accordance with a luminance level of the original video signal, as shown in FIG. 2 and FIG. 3. The non-linear characteristics are obtained in the following manner. For example, when a predetermined address value is given, data of outputting values as shown in FIG. 2 or FIG. 3 is previously written in memory (not shown).

Then, the address value corresponding to the sequentially variable luminance level of the video signal is given to the memory, and thereby, it is possible to select a variable output having the non-linear characteristics as shown in FIG. 2 or FIG. 3 from the memory.

FIG. 4 shows the details of the above scanning line interpolating circuit 11, black stretching circuit 12, display synchronous generating circuit 15 and interpolation mask signal generating circuit 16.

First, the scanning line interpolating circuit 11 comprises a black stretching section 42, a coefficient storing ROM (Read Only Memory) 43, a selector section 44, a frame memory 45 and a read control section 46. More specifically, the black stretching section 42 is connected to a video signal input terminal 41. The coefficient storing ROM 43 stores a coefficient used when the black stretching section 42 carries out black stretching. The selector section 44 alternately outputs the video signal black-stretched by the black stretching section 42 and a video signal inputted to the video signal input terminal 41 for one horizontal scanning interval. The frame memory 45 stores an output from the selector section 44 for one frame period. The read control section 46 reads the video signal stored in the frame memory 45 at double the horizontal scanning line frequency.

The display synchronous generating circuit 15 comprises a synchronous separating section 47 and a display synchronous generating section 48. More specifically, the synchronous separating section 47 separates a synchronizing signal from the video signal supplied to the video signal input terminal 41. The display synchronous generating section 48 multiplies a horizontal synchronizing signal separated by the synchronous separating section 47 so as to generate a display synchronizing signal.

The interpolation mask signal generating circuit 16 comprises a dividing section (divider) 49, which divides an output from the display synchronous generating section 48 into half (½).

The black stretching circuit 12 comprises a black stretching section 50, a coefficient storing ROM 51 and a selector section 52. More specifically, the black stretching section 50 carries out black stretching with respect to the output from the frame memory 45. The coefficient storing ROM 51 stores a coefficient used when the black stretching section 50 carries out black stretching. The selector section 52 alternately outputs the output of the frame memory 45 and the output of the black stretching section 52 at a horizontal scanning interval. The output of the selector section 52 is supplied to the above CRT drive circuit 13 via an output terminal 53.

FIG. 5A to FIG. 5D show a signal waveform of each section shown in the block diagram of FIG. 4. More specifically, a video signal supplied to the video signal input terminal 41 is as shown in FIG. 5A. A coefficient corresponding to the video signal level is read from the coefficient storing ROM 43, and then, supplied to the black stretching section 42.

The coefficient read from the coefficient storing ROM 43 is a coefficient used for carrying out the processing shown in FIG. 2 or FIG. 3 with respect to the video signal, that is, for carrying out non-linear processing with respect to the input video signal.

The selector section 44 is controlled by a horizontal synchronizing signal as shown in FIG. 5B, outputted from the synchronous separating section 47. By doing so, the already black-stretched video signal and a video signal, which is not yet black-stretched, are selected at the horizontal scanning interval, and then, are stored in the frame memory 45.

A display synchronizing signal shown in FIG. 5C outputted from the display synchronous generating section 48 is supplied to the read control section 46. The read control section 46 reads a video signal from the frame memory 45 at double the horizontal scanning frequency, and outputs it as a signal constituting a field.

The output of the frame memory 45 is subjected to black stretching by the black stretching section 50 based on the coefficient read from the coefficient storing ROM 51, and thereafter, is supplied to the selector section 52. Further, the output of the frame memory 45 is intactly supplied to the selector section 52.

In this case, the selector section 52 is controlled by an interpolation mask signal shown in FIG. 5D outputted from the dividing section (divider) 49. More specifically, the selector section 52 is controlled so as to intactly supply a scanning line signal generated by interpolation of the output from the frame memory 45 to the output terminal 53 while supplying a signal in which the non-interpolation scanning line signal is black-stretched by the black stretching section 50, to the output terminal 53.

By doing so, it is possible to stop black stretching with respect to the scanning line signal generated by interpolation, which has been already black-stretched in the scanning line interpolating circuit 11. Therefore, proper black stretching can be carried out with respect to the non-interpolation scanning line of the original video signal.

What is claimed is:

1. An apparatus for processing a video signal, comprising:
   a video signal receiving section configured to receive an interlace video signal;
   a first generating section configured to generate an interpolation scanning line from the received interlace video signal;
   a first black stretching control section configured to perform black stretching based on a first coefficient, with respect to an interpolation scanning line generated at the first generating section;
   a second black stretching control section configured to perform black stretching based on a second coefficient, with respect to each scanning line of the received interlace video signal; and
   a second generating section configured to generate a non-interlace video signal based on interpolation scanning lines subjected to black stretching by the first and second black stretching control sections.

2. An apparatus for processing a video signal according to claim 1, wherein the second black stretching control section is configured to perform black stretching based on a second coefficient, with respect to each scanning line of the received interlace video signal, the second coefficient being read out from a memory using an address corresponding to a luminance level of a video signal.

3. An apparatus for processing a video signal according to claim 1, wherein the second black stretching control section is configured to perform black stretching with respect to each scanning line of the received interlace video signal based on a second coefficient used for generating a video signal having a luminance level lower than the luminance level of the video signal.

4. An apparatus for processing a video signal according to claim 1, wherein the first black stretching control section is configured to non-linearly vary a luminance level of an interpolation signal in accordance with a luminance level of an interlace video signal.

5. An apparatus for processing a video signal comprising:
   a video signal receiving section configured to receive an interlace video signal;
   a generating section configured to generate an interpolation scanning line from the received interlace video signal;
   a first black stretching control section configured to perform black stretching based on a first coefficient, with respect to an interpolation scanning line generated at the first generating section;
   a conversion section configured to convert the received interlace video signal into a non-interlace video signal by performing a scanning line interpolation processing using an interpolation scanning line subjected to black scanning by the first black stretching control section;
   a second black stretching control section configured to perform black stretching based on a second coefficient, with respect to each scanning line of a non-interlace video signal output from the conversion section; and
   a control section configured to disable the second black stretching control section during a period when an interpolation scanning line of the non-interlace video signal is output.

6. An apparatus for processing a video signal according to claim 5, wherein the second black stretching control section is configured to perform black stretching based on a second coefficient, with respect to each scanning line of the received interlace video signal, the second coefficient being read out from a memory using an address corresponding to a luminance level of a video signal.

7. An apparatus for processing a video signal according to claim 5 wherein the second black stretching control section is configured to perform black stretching with respect to each scanning line of the received interlace video signal based on a second coefficient used for generating a video signal having a luminance level lower than the luminance level of the video signal.

8. An apparatus for processing a video signal according to claim 5, wherein the first black stretching control section is configured to non-linearly vary a luminance level of an interpolation signal in accordance with a luminance level of an interlace video signal.

9. An apparatus for processing a video signal according to claim 5, wherein the control section comprises a synchronous signal generating section configured to generate a synchronous signal based on the interlace video signal, the synchronous signal being used by the conversion section for performing a scanning line interpolation processing;

an interpolation mask signal generating section for generating an interpolation mask signal corresponding to a period when an interpolation scanning line of the non-interlace video signal is output; and a control section configured to prevent black stretching by the second black stretching control section, based on an interpolation mask signal generated by the interpolation mask signal generating section.

10. A method for processing a video signal, comprising:

receiving an interlace video signal;

generating an interpolation scanning line from the received interlace video signal;

performing a first black stretching with respect to a generated interpolation scanning line based on a first coefficient;

converting the received interlace video signal into a non-interlace video signal by performing a scanning line interpolation processing using an interpolation scanning line subjected to the first black stretching;

performing a second black stretching with respect to each scanning line of a converted non-interlace video signal based on a second coefficient; and preventing the second black stretching during a period when an interpolation scanning line of the non-interlace video signal is output.

11. A method for processing a video signal according to claim 10, wherein the second black stretching is prevented during a period when an interpolation scanning line of the non-interlace video signal is output, by generating a synchronous signal used for performing the scanning line interpolation processing, based on the interlace video signal; and generating an interpolation mask signal corresponding to a period when an interpolation scanning line of the non-interlace video signal is output, based on a generated synchronous signal, wherein the second black stretching is prevented based on a generated interpolation mask signal.

* * * * *